Nov. 20, 1962 P. M. WALKER 3,064,898

ELECTRIC CIRCUITS FOR GENERATING AN OUTPUT VOLTAGE WHICH IS APPROXIMATELY PROPORTIONAL TO A FUNCTION OF AN INPUT VOLTAGE

Filed June 24, 1958 2 Sheets-Sheet 1

INVENTOR
PETER MICHAEL WALKER
BY Kirschstein, Kirschstein & Ottinger
ATTORNEYS

Nov. 20, 1962 P. M. WALKER 3,064,898
ELECTRIC CIRCUITS FOR GENERATING AN OUTPUT VOLTAGE
WHICH IS APPROXIMATELY PROPORTIONAL TO
A FUNCTION OF AN INPUT VOLTAGE
Filed June 24, 1958 2 Sheets-Sheet 2

INVENTOR
PETER MICHAEL WALKER
BY Kirschstein, Kirschstein & Ottinger
ATTORNEYS

United States Patent Office 3,064,898

Patented Nov. 20, 1962

3,064,898

ELECTRIC CIRCUITS FOR GENERATING AN OUTPUT VOLTAGE WHICH IS APPROXIMATELY PROPORTIONAL TO A FUNCTION OF AN INPUT VOLTAGE

Peter Michael Walker, Watford, England, assignor to The General Electric Company Limited, London, England Filed June 24, 1958, Ser. No. 744,265
Claims priority, application Great Britain July 17, 1957
7 Claims. (Cl. 235—197)

The present invention relates to electric circuits for generating an output voltage which is approximately proportional to a function of an input voltage.

The invention is not restricted to circuits responsive to only one input voltage and in some cases the output voltage may, in fact, be approximately proportional to a function of two input voltages. Hereafter in this specification an electric circuit capable of generating an output voltage which is approximately proportional to a function of one or more input voltages will be referred to as a function generator. Function generators may be used particularly, but not exclusively, in electronic analogue computers.

One object of the present invention is to provide a function generator.

It is well known in an analogue computer to use a circuit comprising an amplifier having an input impedance $Z_I$ in series with it and a feedback impedance $Z_F$ connected between the input and the output of the amplifier. If the amplifier has a high gain and a low drift with respect to time the relationship between the input and output voltages of such a circuit approximates to $$V_O=V_I\frac{Z_F}{Z_I}$$

where $V_I$ is the input voltage, and
$V_O$ is the output voltage.

It is however frequently necessary, in a computer, to evaluate one variable which is a non-linear function of another. The present invention is particularly, but not exclusively, concerned with the case where it is required to generate an output voltage which is dependent on an input voltage and which has a power law relationship with the input voltage.

Hereafter in this specification an electric circuit capable of generating an output voltage which is approximately proportional to a power law funciton of an input voltage will be referred to as a power law function generator and an electric circuit capable of generating an output voltage which is approximately proportional to the square of an input voltage will be referred to as a square law function generator. Similarly, a function generator capable of generating an output voltage which is approximately proportional to the product of two input voltages will be referred to as a multiplier and a function generator capable of generating an output voltage which is approximately proportional to the quotient of two input voltages will be referred to as a divider. An electric circuit capable of generating an output voltage which is approximately proportional to a root of an input voltage will be referred to as a root generator and where the said root is the square root the circuit will be referred to as a square root generator.

One known kind of power law function generator comprises an amplifier unit in which the gain of the unit varies with the input voltage. This may be done in steps by replacing the input impedance of the simple circuit referred to above by a number of biased diodes with series resistors, such that the number of diodes conducting depends upon the input voltage. The power law curve may then be approximated to by a number of straight lines and the accuracy with which the curve is generated depends on the number of straight lines making up the curve and hence on the number of diodes used. This system has the major disadvantage that if the power law function generator is followed by a differentiator a step will appear at each change of slope of the power law curve. In addition a large number of diodes will be necessary for the generation of a reasonably accurate curve.

A second known kind of power law function generator employs non-linear resistors, that is to say devices, the resistance of which varies with the applied voltage. Such non-linear resistors may for example comprise discs of silicon carbide and a disc of this material will have a current/voltage characteristic of the form:

$$I=KV^{\alpha}$$

where

K and $\alpha$ are constants, and
I is the current flowing in the non-linear resistor for a voltage V across it.

Thus to produce the required power law curve, the curve generated by the non-linear resistor alone is modified by the addition of series and/or parallel resistors (where not otherwise stated the term "resistor," where it appears in this specification, should be taken to mean "linear resistor"), and it is in fact possible to construct non-linear function generators with a wide range of output to input voltage laws provided that the characteristic $\alpha$ of the resultant curve is less than or equal to that of the non-linear resistor on its own. Non-linear function generators of this general type employing non-linear resistors are described in "Simulators—Some Applications In Industry" by Peggy L. Hodges in the "G.E.C. Journal" volume 23, Number 4 for October 1956, pages 180 and 181.

It has been found that with the silicon carbide non-linear resistors used the value of $\alpha$ remains reasonably constant at relatively high input voltages but that for low input voltages the value of $\alpha$ becomes less and may even fall to say 50% of the value as compared with the higher input voltage range. This variation in the value of $\alpha$ will give rise to inaccuracies when such a non-linear resistor is used in a power law function generator with a wide range of input voltages.

Another object of the present invention is to provide a power law function generator in which these inaccuracies are at least partly removed.

According to one aspect of the present invention a power law function generator comprises an adding circuit of the kind formed by an amplifier having a feedback path connected across it, a first input path which includes a non-linear impedance and which is arranged to supply a first input current to the amplifier input in dependence upon an input voltage supplied to the power law function generator, and a second input path which includes at least one additional non-linear impedance and which is arranged to supply a second input current to the amplifier input in dependence upon said input voltage to the power law function generator, the arrangement being such that the output derived from said amplifier approximates more nearly to the required power law than would be the case in the absence of said second input current.

According to a second aspect of the present invention a root generator comprises an input terminal; an output terminal; an amplifier having an input and an output, said amplifier output being connected to said output terminal; an input path connected between said input terminal and said amplifier input, said input path including a linear impedance and being arranged to supply an input current to said amplifier input in dependence upon an input voltage supplied to said input terminal; a first feedback path connected between said amplifier output and said amplifier input, said first feedback path including a non-linear impedance and being arranged to feed back a first feedback current to said amplifier input; and a second feedback path connected between said amplifier output and said amplifier input, said second feedback path including at least one additional non-linear impedance and being arranged to feed back a second feedback current to said amplifier input, the arrangement being such that the output from said amplifier approximates more nearly to the required root than would be the case in the absence of said second feedback current.

According to a third aspect of the present invention a multiplier comprises first and second input terminals to which, in operation, are supplied first and second input voltages respectively, an output terminal; first and second square law function generators; first means arranged to supply to said first square law function generator first and second voltages which are equal in magnitude but opposite in sign, said first and second voltages being proportional to the sum of said first and second input voltages; second means arranged to supply to said second square law function generator third and fourth voltages which are equal in magnitude but opposite in sign, said third and fourth voltages being proportional to the difference of said first and second input voltages; each said square law function generator comprising first and second input points, to which in the case of said first square law function generator said first and second voltages respectively, and in the case of said second square law function generator said third and fourth voltages respectively are arranged to be supplied, an output point, a first path connected between said first input point and said output point, said first path including a non-linear impedance and being arranged to supply a first current to said output point in dependence upon the voltage supplied to said first input point, said first current being approximately proportional to the square of the appropriate first or third voltage supplied to said first input point, a second path connected between said first input point and said output point, said second path including a second non-linear impedance, and a third path connected between said second input point and an intermediate point in said second path between said second non-linear impedance and said first input point, said third path including a third non-linear impedance, and said second and third paths being arranged to supply a second current to said output point in dependence upon the appropriate second or fourth voltage supplied to said second input point, said second current correcting said first current; and adding means common to both said first and second square law function generators for adding both of said first and both of said second currents, the arrangement being such that the output from said adding means which is supplied to said output terminal is approximately proportional to the product of said first and second input voltages.

According to a fourth aspect of the present invention a divider comprises first and second input terminals to which, in operation, are supplied first and second input voltages respectively; an output terminal; an amplifier having an input and an output, said amplifier output being connected to said output terminal; an input path connected between said first input terminal and said amplifier input, said input path including a linear impedance and being arranged to supply an input current to said amplifier input in dependence upon a first input voltage supplied to first input terminal; a feedback path connected between said amplifier output and a feedback terminal, said feedback path being arranged to supply a feedback voltage to said feedback terminal; first and second square law function generators; first means arranged to supply to said first square law function generator first and second voltages which are equal in magnitude but opposite in sign, said first and second voltages being proportional to the sum of said second input voltage and said feedback voltage; second means arranged to supply to said second square law function generator third and fourth voltages which are equal in magnitude but opposite in sign, said third and fourth voltages being proportional to the difference of said second input voltage and said feedback voltage; each said square law function generator comprising first and second input points, to which in the case of said first square law function generator said first and second voltages respectively, and in the case of said second square law function generator said third and fourth voltages respectively, are arranged to be supplied, an output point, a first path connected between said first input point and said output point, said first path including a non-linear impedance and being arranged to supply a first current to said output point in dependence upon the voltage supplied to said first input point, said first current being approximately proportional to the square of the appropriate first or third voltage supplied to said first input point, a second path connected between said first input point and said output point, said second path including a second non-linear impedance, and a third path connected between said second input point and an intermediate point in said second path between said second non-linear impedance and said first input point, said third path including a third non-linear impedance, and said second and third paths being arranged to supply a second current to said output point in dependence upon the appropriate second or fourth voltage supplied to said second input point, said second current correcting said first current; the arrangement being such that the output appearing at said output terminal is approximately proportional to the quotient, said first input voltage divided by said second input voltage.

Preferably the said non-linear impedances are non-linear resistors which may be formed of silicon carbide. The silicon carbide may be in the form of a disc which may have been dried and then sealed to prevent the ingress of moisture.

Five examples of function generators in accordance with the present invention will now be described by way of example with reference to the accompanying drawings in which.

Figure 1:
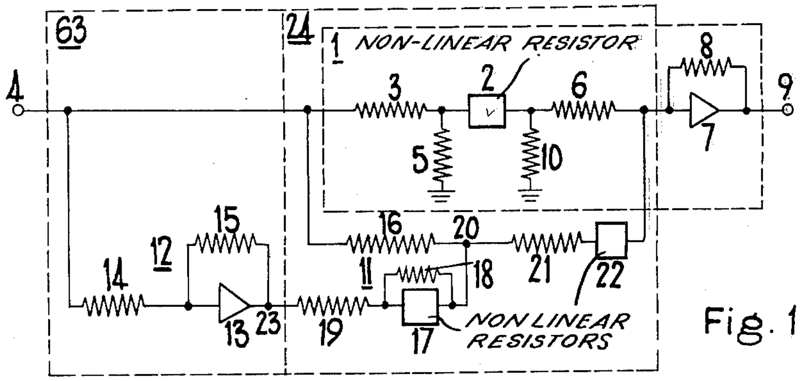
FIGURE 1 shows the circuit of a square law function generator.

In the description of the first example that follows the components of the circuit of FIGURE 1 of the drawing will be ascribed values in accordance with a particular square law function generator that has been built and operated although it should be realised that this is done for the sake of simplicity only, and that the component values given are by way of example, the principle involved being equally applicable to a circuit having different component values.

Referring now to FIGURE 1 of the drawing, the circuit arrangement within the broken rectangle 1 represents a square law function generator of a type that has previously been proposed. The circuit comprises a non-linear resistor 2 that is in the form of a disc of silicon carbide which has a current/voltage characteristic of the form $$I=KV^{\alpha}$$

where $K=8.4\times 10^{-10}$, $\alpha=3.4$, and the resistance of the non-linear resistor 2 is 100 kilohms, these values all being measured with a voltage across the disc of 50 volts. At lower input voltages the value of $\alpha$ is found to fall to approximately 2. Since the characteristics of silicon carbide are, to some extent, affected by humidity, the non-linear resistors used may, if necessary, be thoroughly dried and then sealed in an epoxy-resin plastic material.

One terminal of the non-linear resistor 2 is connected through a resistor 3 in series to an input terminal 4 and also through a resistor 5 to earth. The other terminal of the non-linear resistor 2 is connected through a resistor 6 in series to the input side of a direct coupled amplifier 7, the amplifier 7 having a feedback resistor 8, and the output side of the amplifier 7 being connected to an output terminal 9. The amplifier 7 has a high gain (greater than 20,000) and a low drift (less than one millivolt referred to the input grid over a period of several hours). The junction between the non-linear resistor 2 and the resistor 6 is connected to earth through a resistor 10. The values of the resistors are as follows:

| | | |
|---|---|---|
| Resistor 3 | Kilohms | 70 |
| Resistor 5 | do | 167 |
| Resistor 6 | do | 114 |
| Resistor 8 | megohms | 2.9 |
| Resistor 10 | Kilohms | 10 |

With the circuit arrangement that is shown within the rectangle 1 an input voltage of +V applied to the terminal 4 will result in an output voltage of $$-\frac{V|V|}{100}$$

appearing at the output terminal 9. The accuracy with which this relation between the input voltage and the output voltage is maintained is largely dependent upon the characteristics of the disc 2 and in the particular example given it is found that when operating with input voltages in the range 0 to 100 volts, the error in the output voltage varies between zero when the input is zero or 100 volts, and approximately −4 volts when the input voltage is in the region of 45 volts.

In accordance with the present invention these errors are largely overcome by the addition of further non-linear resistors to the circuit described above. It is observed that when a resistor is placed in series with a silicon carbide non-linear resistor the effective power law, that is to say the value of $\alpha$ for the combination, varies, as the input voltage is increased, from the value that is typical of the non-linear resistor to unity, whilst for a parallel resistor this change of power law occurs in the reverse direction for an increasing input voltage. It will be appreciated therefore that combined series and parallel resistors will enable a range of power laws to be obtained between given input voltage limits.

The components additional to those within the rectangle 1 include a potential divider, generally designated by the reference numeral 11 and a sign changer, generally designated by the reference numeral 12. The sign changer 12 comprises an amplifier 13, similar to the amplifier 7, which is connected between the input terminal 4 and one end of the potential divider 11, and two resistors 14 and 15 of equal value, the resistor 14 being in series with the amplifier 13 and the resistor 15 being connected between the input and output of the amplifier 13.

The potential divider 11 comprises a resistor 16 and a non-linear resistor 17 having a resistor 18 in parallel and a resistor 19 in series with it. The non-linear resistor 17 is of the same type and consequently has similar characteristics to the non-linear resistor 2. The point 20 between the resistor 16 and the non-linear resistor 17 is connected through a resistor 21 in series with a further non-linear resistor 22 to the input of the amplifier 7. For the non-linear resistor 22, $K=3.2\times10^{-11}$, $\alpha=4.3$ and the resistance of the non-linear resistor 22 is 75 kilohms, these values all being measured with a voltage across the disc of 50 volts. The values of the other additional resistors are as follows:

| | | |
|---|---|---|
| Resistor 14 | Kilohms | 100 |
| Resistor 15 | do | 100 |
| Resistor 16 | do | 100 |
| Resistor 18 | do | 15 |
| Resistor 19 | do | 50 |
| Resistor 21 | do | 50 |

The values of the remaining components are unchanged.

The effect of the sign changer 12 is that when a voltage V is applied to the input terminal 4 a voltage −V will appear at the point 23.

Considering now the point 20 in the potential divider 11, the voltage at the point 20 will initially be positive and will increase positively with V. As V increases further, however, the voltage at the point 20 will fall until, when the resistance between the point 20 and the input terminal 4 by way of the resistor 16, and the resistance between the point 20 and the point 23 are equal the voltage at the point 20 will be zero. The effect of the potential divider 11 is, therefore, to apply a small correcting current to the input of the amplifier 7 over a certain range of values of the input voltage V. The amplifier 7 adds this correcting current to the current at the input of the ampliler 7 due to that part of the circuit within the broken rectangle 1. The resistor 21 and the non-linear resistor 22 further modify this correcting current and ensure that the square law curve generated has zero slope at the origin, which would not be the case if there were a linear resistance path between the input terminal 4 and the amplifier 7, for example, by way of the resistor 16, so that no discontinuity will arise if the square law function generator is followed by a differentiator.

Figure 2:
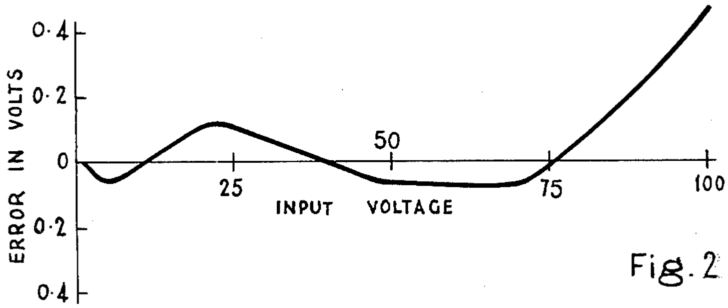
FIGURE 2 shows an error curve for the square law function generator of FIGURE 1.

FIGURE 2 of the drawing shows the error curve for the square law function generator of FIGURE 1, the error in the output voltage being plotted against the input voltage. It will be seen that the maximum error is approximately +0.4 volt and occurs at the upper limit of the input voltage range, that is to say at 100 volts input. In the input voltage range 0 to 80 volts however the error does not exceed approximately ±0.15 volt.

The particular silicon carbide non-linear resistors 2, 17 and 22 used and the particular values chosen for the other resistors result in an output voltage that has a particularly small error in the region of the origin on the square law curve. If however the square law function generator were intended to be used primarily with an input voltage lying within a range other than that in the region of the origin, the components of the circuit could be so selected that the minimum errors in the output voltage occurred for the range that was to be used.

The circuit described with reference to FIGURE 1 of the drawing gives an output of $$-\frac{V|V|}{100}$$

for an input of V and in consequence the sign of the output will change with the sign of V. This difficulty may be overcome by the use of diode switches so arranged that the voltages applied to the terminal 4 and the point 23 are +|V| and −|V| respectively. With this arrangement the output voltage will always be negative and will not change sign with V. If a positive output voltage is required this may readily be achieved by reversing the diode switches so that the voltages applied to the terminal 4 and the point 23 are −|V| and +|V| respectively.

Figure 3:
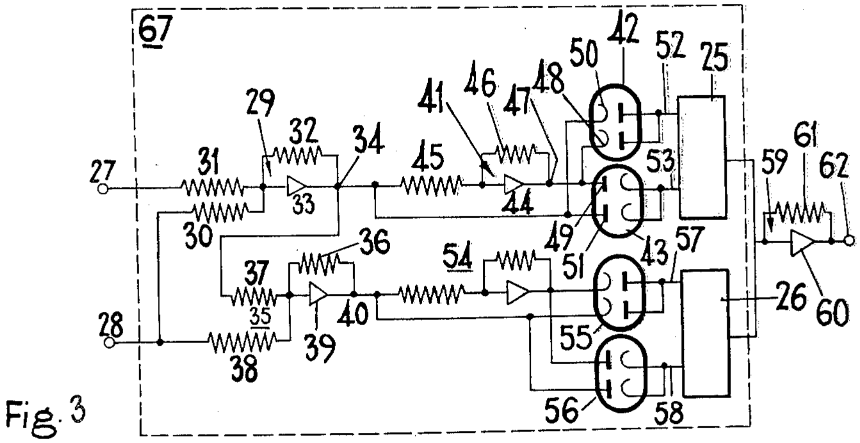
FIGURE 3 shows, partly in schematic form, the circuit of a multiplier.

Although a square law funtion generator as such might well be required in an analogue computer, such an arrangement also finds application in circuits for performing more complicated operations. One such application is illustrated in FIGURE 3 of the drawing which shows a multiplier which makes use of two square law function generators similar to that shown in FIGURE 1 of the drawing less the sign-changing circuit 12, the amplifier 7 and resistor 8, that is to say the circuit contained within the broken rectangle 24. The square law function generators are, in FIGURE 3 of the drawing, represented by the rectangles 25 and 26. The multiplier uses the quarter square method of multiplying two quantities $x$ and $y$ which is based on the identity:

$$\left(\frac{x+y}{2}\right)^2-\left(\frac{x-y}{2}\right)^2\equiv xy$$

The circuit of FIGURE 3 comprises two input terminals 27 and 28 to which are supplied input voltages proportional to the quantities $x$ and $y$ to be multiplied respectively; for simplicity these inputs will hereinafter be referred to as the voltages $x$ and $y$. The voltages $x$ and $y$ are applied to an adding circuit, generally designated by the reference numeral 29, that comprises resistors 30, 31 and 32 and an amplifier 33 of the type previously described. The resistor 32 which is one half the value of each of the resistors 30 and 31 is connected between the input and the output of the amplifier 33 whilst the resistors 30 and 31 are connected between the input side of the amplifier 33 and the terminals 28 and 27 respectively. With this arrangement the voltage appearing at the point 34 on the output side of the amplifier 33 will be $$-\frac{x+y}{2}$$

The voltage appearing at the point 34 together with the input voltage $y$ from the input terminal 28 is fed to a second adding circuit, generally designated by the reference numeral 35, that comprises equal resistors 36, 37 and 38 and an amplifier 39 similar to the amplifier 33. The resistor 36 is connected between the input and the output of the amplifier 39 whilst the resistors 37 and 38 are connected between the input side of the amplifier 39 and the point 34 and the terminal 28 respectively. The voltage appearing at the point 40 on the output side of the amplifier 39 will be $$\frac{x-y}{2}$$

The voltage from the point 34 is fed to the square law function generator 25 by way of a sign changing circuit 41 and two double diodes 42 and 43. The sign changing circuit 41 comprises an amplifier 44 that is similar to the amplifier 33 with a series resistor 45 and a feedback resistor 46, the resistors 45 and 46 being of equal value. The voltage appearing at the point 47 on the output side of the amplifier 44 will therefore be $$\frac{x+y}{2}$$

and this voltage is fed to one cathode 48 of the double diode 42 and to one anode 49 of the double diode 43. The voltage $$-\frac{x+y}{2}$$

is also fed direct from the point 34 to the other cathode 50 of the double diode 42 and to the other anode 51 of the double diode 43. With this arrangement the voltage fed by the double diodes 42 and 43 to the inputs 52 and 53 respectively of the square law function generator 25 will be $$-\left|\frac{x+y}{2}\right| \text{ and } +\left|\frac{x+y}{2}\right|$$

whether $x$ and $y$ be positive, both negative, or of opposite signs.

The voltage $$\frac{x-y}{2}$$

appearing at the point 40 is dealt with in similar manner by the sign changing circuit 54 and the double diodes 55 and 56, so that the inputs 57 and 58 of the square law function generator 26 are fed with voltages of $$-\frac{x-y}{2} \text{ and } +\frac{x-y}{2}$$

respectively. The outputs from the square law function generators 25 and 26 are fed to an adding circuit 59 which comprises an amplifier 60 similar to the amplifier 33 with a feedback resistor 61 so that the output voltage appearing at the terminal 62 is $$-\frac{xy}{100}$$

In connecting the square law function generators 25 and 26 the inputs 52 and 58 correspond to the point 23 (FIGURE 1) and inputs 53 and 57 correspond to the junction between resistors 3 and 16 (FIGURE 1). It is not essential for the square law function generators 25 and 26 to have adding circuits corresponding to the amplifier 7 and the resistor 8 of FIGURE 1 as the function of these adding circuits may equally well be carried out by the adding circuit 59 with a consequent saving of amplifiers.

The double diodes 42, 43, 55 and 56 together form an "all quadrant" switch and it is necessary for the satisfactory operation of the circuit that the switching is carried out smoothly. This may be achieved by the selection of pairs of diodes having low and equal back voltages and if necessary by applying a bias current to the diodes to reduce still further the back voltage. In adjusting the values of the circuit components the impedance of the diodes must be taken into account.

It has been found possible with the arrangement described to construct a multiplier having a maximum error of 1 volt in the output voltage over an input range of 0 to 100 volts whilst over most of the input range the error is considerably smaller.

Figure 4:
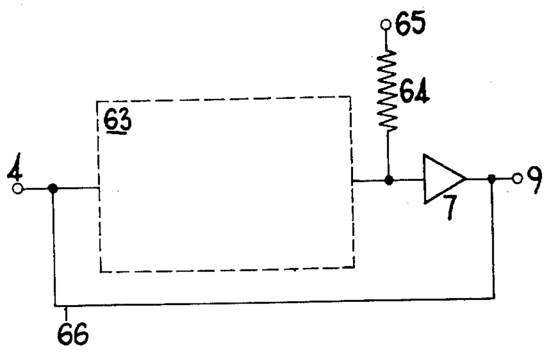
FIGURE 4 shows, partly in schematic form, the circuit of a square root generator.

The square law function generator shown in FIGURE 1 may be readily converted into a square root function generator. This conversion is shown in FIGURE 4 of the drawings in which the broken rectangle 63 represents the circuit shown within the broken rectangle 63 of FIGURE 1. In addition, parts of the circuit of FIGURE 1 which also appear in FIGURE 4 have been denoted by similar reference numerals.

In the square root function generator of FIGURE 4 a resistor 64 connected between an input terminal 65 and the input side of the amplifier 7 is provided in place of the resistor 8 of the circuit of FIGURE 1. The value of the resistor 64 is the same as was the value of the resistor 8 of the circuit of FIGURE 1. The circuit of the square root function generator is completed by a feedback loop 66 connected between the output terminal 9 and input terminal 4. In fact, the terminal 4 may then be dispensed with.

With this arrangement an input voltage $x$ applied to the input terminal 65 will give rise to an output voltage proportional to $\sqrt{x}$ appearing at the output terminal 9.

Figure 5:
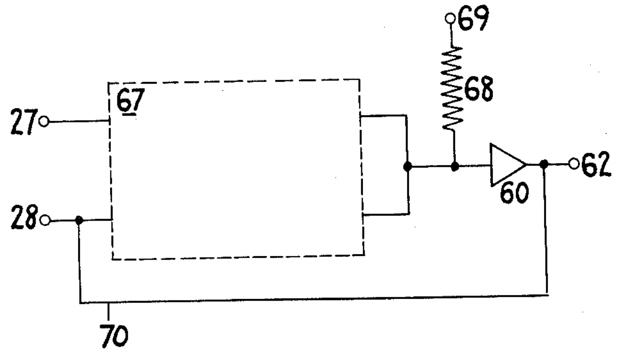
FIGURE 5 shows, partly in schematic form, the circuit of a divider.

The multiplier shown in FIGURE 3 may be converted to a divider in a rather similar manner. This conversion is shown in FIGURE 5 of the drawings in which the broken rectangle 67 represents the circuit shown within the broken rectangle 67 of FIGURE 3. In addition, parts of the circuit of FIGURE 3 which also appear in FIGURE 5 have been denoted by similar reference numerals.

In the divider of FIGURE 5 a resistor 68, connected between an input terminal 69 and the input side of the amplifier 60, is provided in place of the resistor 61 of FIGURE 3. The value of the resistor 68 is the same as was the value of the resistor 61 of FIGURE 3. The circuit of the divider is completed by a feedback loop 70 connected between the output terminal 62 and the input terminal 28 and, in fact, the terminal 28 may then be dispensed with.

This arrangement is such that when an input voltage $p$ is applied to the terminal 27 and an input voltage $q$ is applied to the input terminal 69, the voltage appearing at the output terminal 62 will be proportional to $$-\frac{q}{p}$$

Although particular reference has been made to a square law function generator and the circuits derived therefrom, it will be realised that the principle of the invention may equally well be applied to circuits for generating other power laws and roots. With the arrangement described with reference to FIGURE 1 it is not however possible to generate a power law having an index higher than the value of $\alpha$ for the silicon carbide discs although if a higher power is required, more than one such power law function generator may be arranged in cascade.

I claim:

1. A power law function generator comprising an input terminal to which an input voltage is arranged to be supplied, an output terminal, an adding circuit including an amplifier having an input and an output, a direct connection between the output of said amplifier and said output terminal, and circuit means including a feedback path connecting the output of said amplifier to the input of said amplifier, a first input path connected between said input terminal and the input of said amplifier, said first input path including a first non-linear resistance and being arranged to supply a first input current to the input of said amplifier in dependence upon an input voltage supplied to said input terminal, said first input current giving rise to an output from said adding circuit which is approximately proportional to the required power law function of said input voltage, a second input path connected between said input terminal and the input of said amplifier, said second input path including a second non-linear resistance, and a third input path connected between said input terminal and an intermediate point in said second input path between said second non-linear resistance and said input terminal, said third input path including a third non-linear resistance, and said second and third input paths being arranged to supply a second input current to the input of said amplifier in dependence upon said input voltage, the first, second and third non-linear resistances each having an input and an output and each having a current/voltage characteristic in the form of $I=KV^{\alpha}$, where I is the current flowing in said non-linear resistance for a voltage V between its input and output, K is a constant, and $\alpha$ is a constant for a range of values of V, said adding circuit adding said first and second currents and supplying to said output terminal an output voltage which is more nearly proportional to the required power law function of said input voltage than would be the case in the absence of said second input current.

2. A power law function generator according to claim 1 where in the first, second and third non-linear resistances are all formed of silicon carbide.

3. A power law function generator according to Claim 1 wherein said feedback path comprises a first linear resistor.

4. A power law function generator according to Claim 3 wherein said first input path comprises a first potential divider connected between said input terminal and earth, and a second potential divider connected between said amplifier input and earth, said first non-linear impedance being connected between two points, one on each of said potential dividers.

5. A power law function generator according to claim 3 wherein the third input path includes second and third linear resistors, the second linear resistor being connected in series with the third non-linear resistance and said third linear resistance being connected in parallel with said third non-linear resistance.

6. A power law function generator comprising an input terminal to which an input voltage is arranged to be supplied, an output terminal, an adding circuit including an amplifier having an input and an output, a direct connection between the output of said amplifier and said output terminal, and circuit means including a path connecting said output terminal to the input of said amplifier, first means arranged to supply a first current to the input of said amplifier in dependence upon said input voltage, said first current giving rise to an output from said amplifier which is approximately proportional to the required power law function of said input voltage, and second means arranged to supply a second current to the input of said amplifier in dependence upon said input voltage, said first and second means each including a non-linear resistance having an input and an output and having a current/voltage characteristic substantially of the form of $I=KV^{\alpha}$, where I is a current flowing in said non-linear resistance for a voltage V between its input and output, K is a constant, and $\alpha$ is a constant for a range of values of V, said adding circuit adding said first and second currents and supplying to said output terminal an output voltage which is more nearly proportional to the required power law function of said input voltage than would be the case in the absence of said second current.

7. A power law function generator in accordance with claim 6 wherein said first and second non-linear resistances are both formed of silicon carbide.

References Cited in the file of this patent

UNITED STATES PATENTS 2,890,832 Stone ---------------- June 16, 1959

OTHER REFERENCES

Electronic Analog Computers, 2nd edition (Korn et al.), McGraw-Hill, 1956, pp. 338–339.

Waveforms (Chance et al.), 1949, pp. 668, 689 and 690.

IRE Transaction-Electronic Computers (Kovach et al. I), June 1954, pp. 42–45.

Electronic Engineering (Brown et al.), March 1958, pp. 154–157.

IRE Transaction-Electronic Computers (Kovach et al. II), June 1958, pp. 91–96.